Feb. 10, 1970  F. W. CLARKE  3,494,077
MACHINE TOOL HAVING A VARIABLE-STROKE DRIVE
Filed June 23, 1967  2 Sheets-Sheet 1
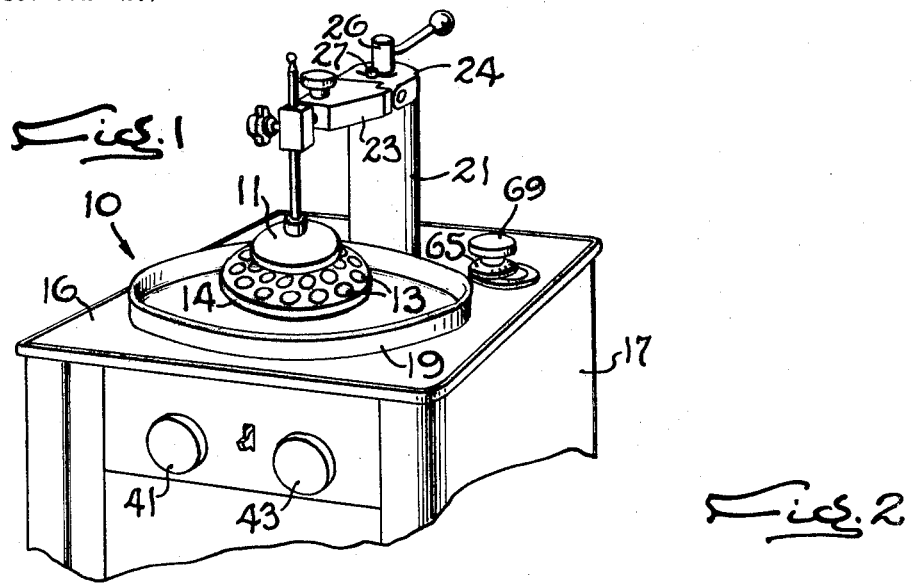
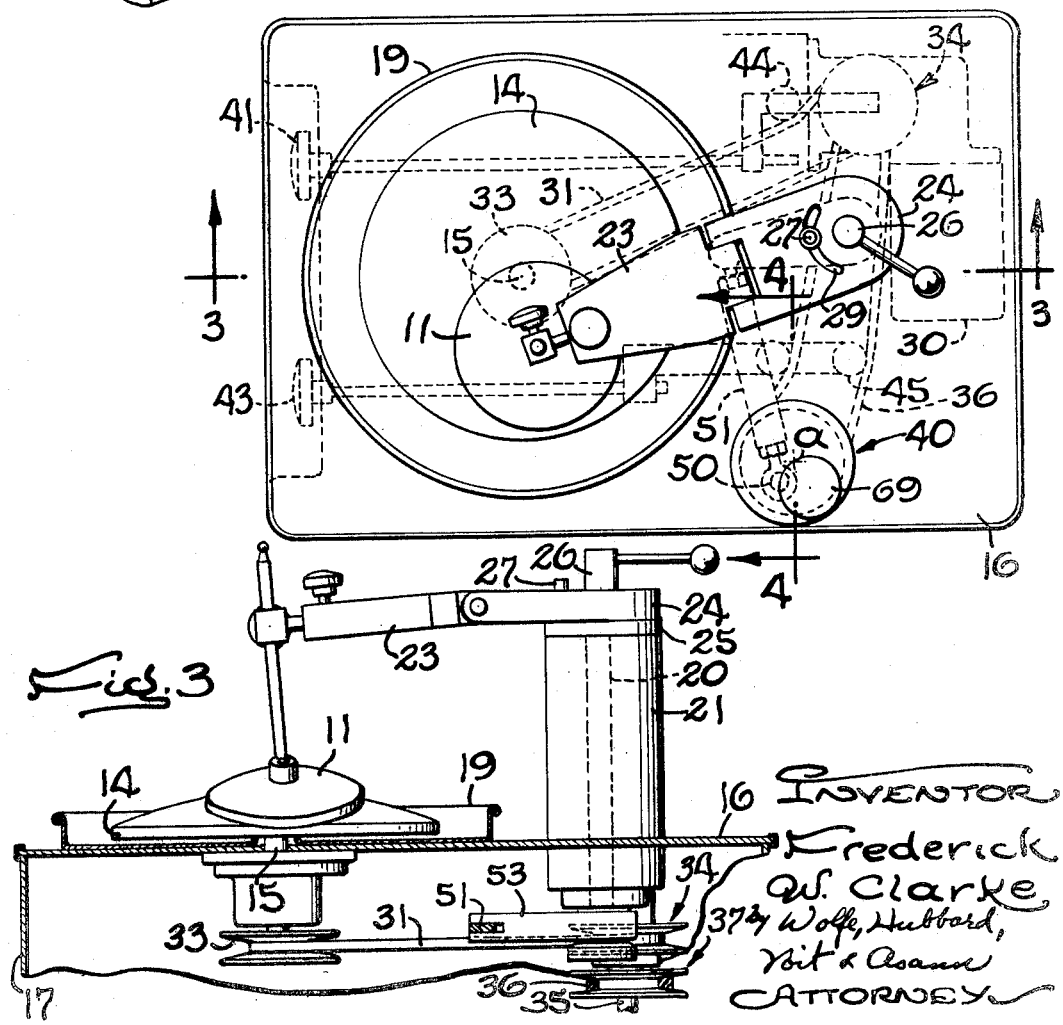
INVENTOR
Frederick W. Clarke
Wolfe, Hubbard,
Voit & Osann
ATTORNEY Feb. 10, 1970   F. W. CLARKE   3,494,077
MACHINE TOOL HAVING A VARIABLE-STROKE DRIVE
Filed June 23, 1967   2 Sheets-Sheet 2
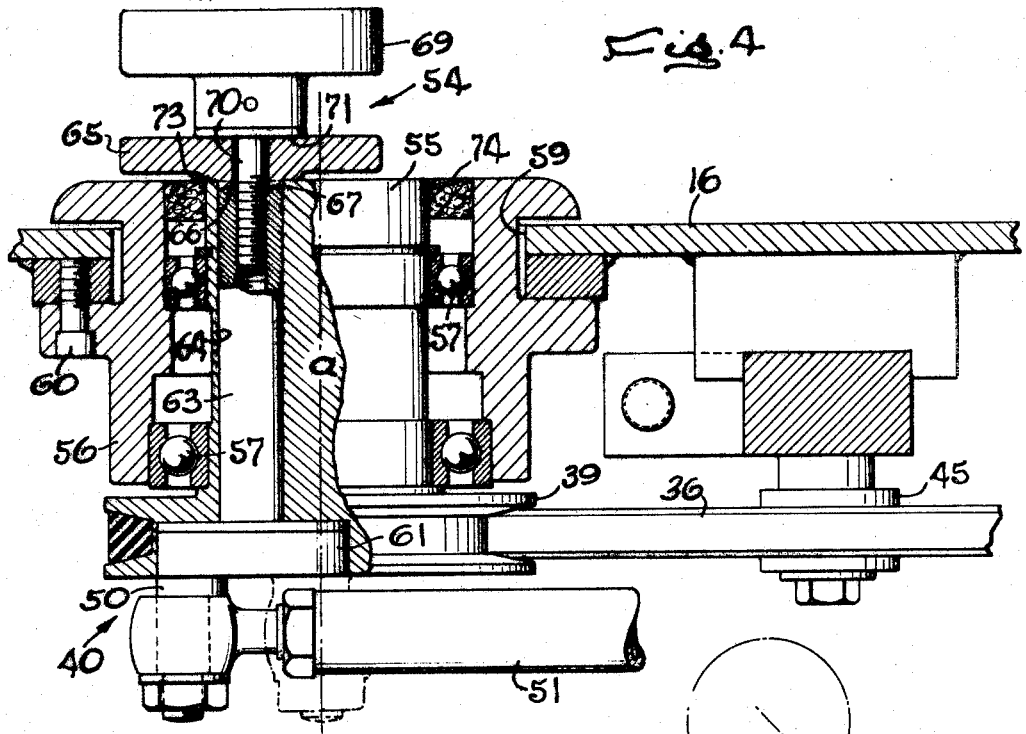
Fig. 4
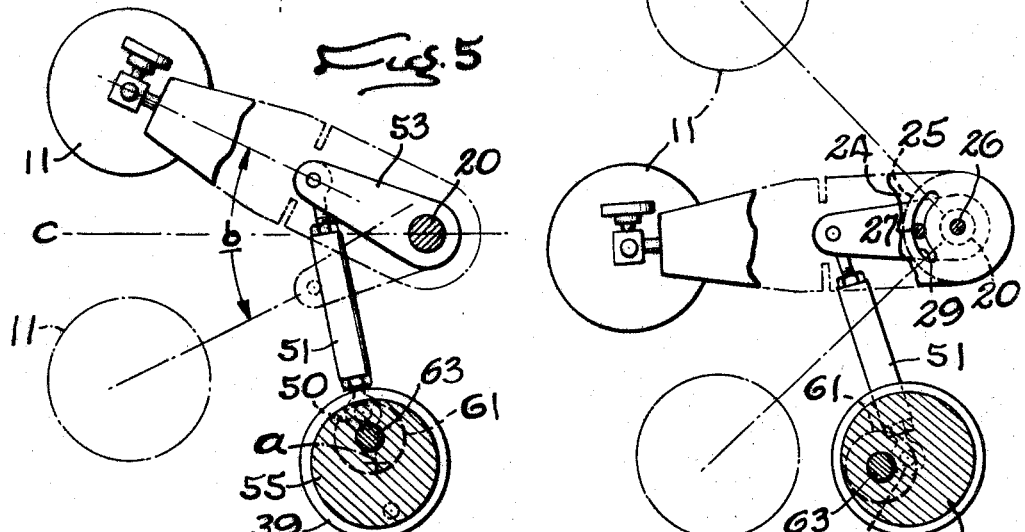
Fig. 5
Fig. 6
INVENTOR
Frederick W. Clarke
by Wolfe, Hubbard, Voit & Osann
ATTORNEY United States Patent Office 3,494,077
Patented Feb. 10, 1970

3,494,077
MACHINE TOOL HAVING A VARIABLE-STROKE DRIVE
Frederick W. Clarke, Rockford, Ill., assignor to Rogers and Clarke Manufacturing Co., Rockford, Ill., a corporation of Illinois
Filed June 23, 1967, Ser. No. 648,292
Int. Cl. B24b 7/00, 9/00; F16h 21/18
U.S. Cl. 51—58
9 Claims

ABSTRACT OF THE DISCLOSURE

An abrading tool mounted on the upper side of a table and oscillated back and forth by an eccentric mounted on a shaft which may be rotated manually relative to the axis of a quill driving the eccentric thereby to adjust the oscillating stroke of the tool. All of the elements of the mechanism for driving the tool are mounted below the table so as to be protected from foreign material, and a manually operable control accessible from the upper side of the table is provided for adjusting the position of the shaft and the eccentric to vary the stroke of the tool.

BACKGROUND OF THE INVENTION

This invention relates to a machine tool of the type having a tool mounted for back and forth oscillation on the upper side of a table and, more particularly, to a machine tool in which the tool is oscillated by a drive mechanism including an eccentric normally coupled to and driven by a rotary member and adapted for rotational adjustment toward and away from the axis of the member to change the oscillating stroke of the tool.

SUMMARY OF THE INVENTION

With the present invention, the drive mechanism is mounted entirely beneath the table and thus is protected from foreign material accumulating on the top of the table, and yet the stroke of the tool may be adjusted rapidly and easily by a manually operable control conveniently accessible from the top of the table. In a more detailed aspect, the invention contemplates a drive mechanism in which the rotary member is journaled in the table and may be uncoupled from the eccentric from above the table to permit rotational adjustment of the eccentric to change the stroke of the tool.

BRIEF DESCRIPTION OF THE DRAWINGS

FIGURE 1 is a fragmentary perspective view of a machine tool embodying the novel features of the present invention.

FIG. 2 is an enlarged plan view of the machine tool shown in FIG. 1.

FIG. 3 is a fragmentary cross-section taken substantially along the line 3—3 of FIG. 2.

FIG. 4 is an enlarged fragmentary cross-section taken substantially along the line 4—4 of FIG. 2.

FIGS. 5 and 6 are schematic plan views showing various degrees of adjustment of the tool.

DETAILED DESCRIPTION

As shown in the drawings for purposes of illustration, the invention is embodied in a machine tool such as a polishing machine 10 having an abrading or polishing tool 11 which is oscillated back and forth across a plurality of glass lens 13 fastened to a rotatable lens holder 14. Polishing compound usually is sprayed on the lens during the polishing operation and this, in conjunction with the combined oscillating and rotary motions of the tool and the holder, produces a smooth finish on the surface of each lens while the latter is being ground lightly and shaped to an accurate contour.

Herein, the lens holder 14 is convexly shaped and is fast on the upper end of a shaft 15 (FIG. 3) journaled in the top wall or table 16 of a cabinet 17. A pan 19 is disposed on the table and encircles the holder to collect the polishing compound sprayed on the lens 13.

The polishing tool 11 is oscillated back and forth across the lens 13 by an upright driver or shaft 20 (FIG. 3) adapted to be rocked about its longitudinal axis and journaled in a sleeve 21 upstanding from the table 16. As shown in FIG. 3, the tool is carried by and depends from the free end of a horizontal arm 23 which is connected pivotally at its opposite end to a collar 24 to permit the tool to follow the convex contour of the holder 14 during the polishing operation. The collar, in turn, rests on a disk 25 fast on the upper end of the shaft 20 and is angularly adjustable about the axis of the shaft so that the arc through which the tool oscillates may be shifted relative to the holder. That is, by adjusting the angular position of the collar, the tool can be positioned to sweep from one side edge or the other of the holder 14 toward the center thereof, or can be positioned to sweep across the center of the holder and in opposite directions toward the two side edges. To hold the tool in its selected angular position relative to the shaft, a clamp 26 threaded into the upper end of the shaft may be tightened to force the collar downwardly into clamping engagement with the disk. In addition, a clamping screw 27 extending downwardly through an arcuate slot 29 (FIG. 2) in the collar and threaded into the disk may be tightened to insure that the collar will oscillate in unison with the shaft.

In this instance, an electric motor 30 (FIG. 2) is mounted within the cabinet 17 for rotating the lens holder 14 and for oscillating the polishing tool 11. The holder is rotated by an endless belt 31 trained around a pulley 33 (FIG. 3) on the holder shaft 15 and around a variable speed pulley 34 fast on the drive shaft 35 of the motor. A second endless belt 36 is trained around another variable speed pulley 37 on the drive shaft and rotates an input pulley 39 (FIG. 4) of a drive mechanism 40 which converts the rotary motion of the motor into oscillating motion for oscillating the shaft 20 and the tool 11. By adjusting control knobs 41 and 43 on the front of the cabinet 17, a pair of belt tighteners 44 and 45 slidably mounted within the cabinet may be shifted back and forth to vary the tension in the belts 31 and 36, respectively. As the tension in the belts is adjusted, the effective diameters of the variable speed pulleys 34 and 37 are changed thereby to adjust the rotational speed of the holder 14 and the frequency of oscillation of the tool 11 to optimum values for a particular polishing operation.

To convert the rotary motion of the motor 30 into oscillating motion, the drive mechanism 40 includes an eccentric connector pin (FIG. 4) 50 which rotates in unison with the pulley 39 and which is connected pivotally to one end of a pitman 51. The other end of the pitman is connected to the free end of a crank 53 (FIGS. 2 and 5) rigid with the lower end of the tool drive shaft 20 and thus, as the eccentric pin is rotated about the axis of the pulley 39, the drive shaft 20 and the tool 11 are oscillated back and forth through a stroke correlated with the distance between the pin and its axis of rotation which herein is the center of the pulley. To increase the versatility of the machine for different polishing and grinding operations, the oscillating stroke of the tool is adapted to be adjusted through a range varying from a maximum in which the tool sweeps through an arc extending across the entire face of the lens holder 14 and a minimum in which the tool does not oscillate at all but simply remains in a stationary position above the rotating holder.

Herein, adjustment of the stroke is accomplished by moving the eccentric connector pin 50 toward and away from its axis of rotation thereby to vary the degree of eccentricity and to produce a corresponding change in the oscillating stroke of the tool.

In accordance with the present invention, the entire drive mechanism 40 including the eccentric pin 50 is mounted below the table 16 and thus is protected from the polishing compound and abrasive dust resulting from the polishing operation and, at the same time, the eccentric pin may be moved toward and away from its axis of rotation to vary the oscillating stroke of the tool simply by operating a manual control 54 which is accessible from the upper side of the table for easy and rapid adjustment of the stroke. For this purpose the pin is adjustably coupled to a rotatable member 55 (FIG. 4) which defines the axis of rotation of the pin and which, because of its pure rotary motion, may be journaled in the table to seal off the inside of the cabinet 17 and thereby protect the drive mechanism. By operating the control, the pin may be uncoupled from the rotatable member from above the table and may be adjusted toward and away from its axis of rotation to change the oscillating stroke even though the pin itself is disposed beneath the table.

In the present instance, the rotatable member 55 (FIG. 4) is a tubular quill telescope into a hub 56 and journaled for rotation about an upright axis $a$ by a pair of upper and lower ball bearings 57 mounted in the hub. While the hub may be formed as an integral part of the table 16, it preferably is fitted within a hole 59 in the table and is fastened to the underside of the table by screws 60. The pulley 39 is formed integrally with the lower end of the quill, and thus the latter is rotated within the bearings by the motor 30 acting through the endless belt 36 trained around the pulley.

As shown most clearly in FIG. 4, the eccentric pin 50 depends from a disk-like member 61 which is fitted within a socket in the lower side of the pulley 39 and which is fast on the lower end of a shaft 63. The latter is telescoped into a vertical hole 64 formed through the quill along an axis radially offset from the axis $a$ of the quill. As a result, rotation of the off-center shaft within the hole 64 moves the pin 50 from the position shown in full in FIG. 4 to the position shown in phantom. In the first position, the pin is spaced radially a maximum distance from the axis $a$ and acts through the pitman 51, the crank 53 and the shaft 20 to cause the tool 11 to oscillate with a stroke of maximum arcuate length while, in the adjusted position, the pin is aligned longitudinally with the axis $a$ and simply rotates idly relative to the pitman 51 so that the tool remains stationary. By positioning the pin between the two extreme positions, a stroke of any intermediate arcuate length may be obtained to produce optimum results for a particular operation.

To rotate the shaft 63 within the hole 64 and thus adjust the stroke, the manually operable control 54 is disposed on the upper side of the table 16 and includes a coupling 65 (FIG. 4) in the form of a disk disposed face-to-face with the upper end of the quill 55. On its lower face, the disk is formed with an integral key 66 which slidably fits into a complementary shaped slot 67 formed across the upper end of the shaft 63. Thus, by rotating the disk, the shaft 63 will be turned within the hole 64 and the pin 50 will be turned toward and away from the axis $a$.

In order to hold the pin 50 in its adjusted position, the control 54 further includes means for clamping or coupling the shaft 63 and the quill 55 together for rotation in unison about the axis $a$. Herein these means comprise a manually operated locking knob 69 pinned to the upper end of a screw 70 which extends loosely through the disk 65 and which is threaded into a hole formed in the upper end of the shaft 63. When the knob is rotated to tighten the screw, a lower shoulder or abutment 71 on the knob presses against the upper face of the disk to force a boss 73 on the lower face of the disk into tight clamping engagement with the upper end of the quill. Accordingly, the knob rigidly holds the disk and the shaft 63 for rotation in unison with the quill and thus retains the shaft and the pin 50 in their adjusted positions relative to the quill.

With the foregoing arrangement, it is apparent that the stroke of the tool 11 may be adjusted simply by loosening the knob 69 to release the disk 65 from the quill 55, and then by rotating the disk to move the pin 50 toward and away from the axis $a$ of the quill to vary the eccentricity of the pin and the length of the stroke. This adjustment may be made from the upper side of the table 16, and yet since all of the parts of the drive mechanism 40 are mounted below the table and are housed within the cabinet 17, these parts are protected from abrasive material and polishing compound which collects on the top of the table. To further protect the drive mechanism and particularly the ball bearings 57, a sealing ring 74 (FIG. 3) preferably is telescoped between the upper end of the quill and the upper end of the hub 56 to prevent foreign material from gravitating down to the bearings and into the cabinet.

FIGS. 5 and 6 schematically illustrate the adaptability of the tool 11 for operation with different oscillating strokes and in different positions. In FIG. 5, the pin 50 is offset a maximum distance from the axis $a$ and the tool sweeps through an arc $b$ whose ends are equidistant from a center line $c$ extending between the center of the lens holder 14 and the center of the tool driving shaft 20. By moving the pin closer to the axis $a$, the stroke may be decreased and, by adjusting the tool angularly about the shaft 20, the tool may be positioned to oscillate only on one side or the other of the center line $c$. With the parts positioned as shown in full in FIG. 6, the pin 50 is aligned with the axis $a$ and thus the tool simply remains stationary as the lens 13 are rotated beneath it by the holder 14. The tool may be removed to either side of the lens holder to polish the lens near the edges of the holder by releasing the clamping screws 26 and 27 and swinging the tool about the axis of the shaft 20 to the position shown in phantom in FIG. 6. Thus, the adjustable stroke of the tool in conjunction with its angular adjustability result in a very versatile polishing machine suitable for a wide variety of operations.

I claim as my invention:

1. In a machine tool having a variable-stroke drive the combination of, a support having a top wall, a quill journaled for rotation in said wall and having a lower end projecting below the wall, mechanism below said wall connected to the lower end of said quill and operable to rotate the latter about its longitudinal axis, a shaft mounted in said quill for rotation about a second axis parallel to and radially offset from said one axis and having a lower end projecting below said wall, a member fast on the lower end of said shaft and having an eccentric connector radially offset from said second axis, a tool driver journaled for back and forth oscillation in said wall and having one end projecting below the wall and operably coupled to said connector, a releasable coupling normally restricting rotation of said shaft relative to said quill about said second axis and connecting said shaft and said quill together for rotation in unison about said one axis whereby the rotating shaft acts through said connector to cause back and forth oscillation of said driver through a stroke correlated with the distance between said connector and said one axis, and a manually operable control accessible from the upper side of said wall for selectively releasing said coupling thereby to permit manual rotation of said shaft relative to said quill about said second axis and movement of said eccentric connector toward and away from said one axis to change the stroke of said driver.

2. A machine tool as defined in claim 1 further including a sealing ring telescoped between said quill and said wall for preventing foreign material from seeping below the wall.

3. A machine tool as defined in claim 2 further including a bearing between said wall and said quill journaling the latter for rotation, said sealing ring being disposed on the upper side of said bearing to protect the bearing from the foreign material.

4. A machine tool as defined in claim 1 in which said coupling is keyed to the upper end of said shaft and is accessible from the upper side of said wall for manually rotating the shaft about said second axis.

5. A machine tool as defined in claim 4 in which said manually operable control includes a screw extending slidably through said coupling and threaded into the upper end of said shaft, and a fixed abutment on the upper end of said screw movable into engagement with said coupling as the screw is tightened thereby to clamp the coupling tightly to the upper end of said quill.

6. In a machine tool having a variable-stroke drive, the combination of, a cabinet having a top wall, an abrading tool disposed above said top wall and operable to oscillate back and forth across a workpiece positioned beneath the tool, a driver connected to said tool and journaled for back and forth oscillation in said top wall with the lower end of the driver projecting into said cabinet, a quill journaled for rotation in said top wall and having a lower end projecting into said cabinet, mechanism within said cabinet connected to the lower end of said quill and operable to rotate the latter about its longitudinal axis, a shaft mounted in said quill for rotation about a second axis parallel to and radially offset from said one axis and having a lower end projecting into said cabinet, a member fast on the lower end of said shaft and having an eccentric connector radially offset from said second axis and operably coupled to the lower end of said driver, a releasable coupling normally restricting rotation of said shaft about said second axis and normally connecting said shaft and said quill together for rotation in unison about said one axis whereby the shaft acts through said connector and said driver to cause oscillation of said tool through a stroke correlated with the distance between said connector and said one axis, and a manually operable control on the upper side of said top wall and accessible from the outside of the cabinet for selectively releasing said coupling thereby to permit manual rotation of said shaft relative to said quill about said second axis and movement of said eccentric connector toward and away from said one axis to change the stroke of said tool.

7. A machine tool as defined in claim 6 further including a sealing member between said top wall and said quill to prevent foreign material from gravitating into the inside of said cabinet.

8. A machine tool as defined in claim 7 further including a bearing between said top wall and said quill journaling the latter for rotation, said sealing member being disposed on the upper side of said bearing to protect the bearing from the foreign material.

9. A machine tool as defined in claim 6 in which said driver comprises a second shaft journaled in said top wall, said tool being angularly adjustable about the axis of said second shaft to shift the arc of oscillation of the tool, and means for releasably securing said tool to said second shaft to hold the tool in its adjusted position.

References Cited

UNITED STATES PATENTS

| | | | |
|---|---|---|---|
| 1,331,037 | 2/1920 | Sullivan | 51—55 |
| 2,458,384 | 1/1949 | Jeffree | 51—58 |
| 2,835,123 | 5/1958 | Galinski | 308—187.1 |
| 2,605,622 | 8/1952 | Anderson | 308—187.1 |
| 2,592,237 | 4/1952 | Bradley | 74—571 |
| 2,669,316 | 2/1954 | Schjolin | 308—187.1 |
| 2,849,820 | 9/1958 | Reschke | 51—58 |

FRED C. MATTERN, Jr., Primary Examiner

W. S. RATLIFF, Jr., Assistant Examiner

U.S. Cl. X.R.

74—42